(12) United States Patent
Yamamoto et al.

(10) Patent No.: US 11,464,100 B2
(45) Date of Patent: Oct. 4, 2022

(54) VEHICLE HEADLIGHT SYSTEM

(71) Applicants: STANLEY ELECTRIC CO., LTD., Tokyo (JP); HONDA MOTOR CO., LTD., Tokyo (JP)

(72) Inventors: Takuya Yamamoto, Tokyo (JP); Takeshi Onodera, Tokyo (JP); Naoki Muramatsu, Tokyo (JP); Hidetaka Okada, Tokyo (JP); Ryuichi Nakano, Tokyo (JP)

(73) Assignees: STANLEY ELECTRIC CO., LTD., Tokyo (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/482,378

(22) Filed: Sep. 22, 2021

(65) Prior Publication Data

US 2022/0095442 A1 Mar. 24, 2022

(30) Foreign Application Priority Data

Sep. 23, 2020 (JP) .............................. JP2020-158281

(51) Int. Cl.
*H05B 47/20* (2020.01)
*B60Q 1/04* (2006.01)
*B60Q 11/00* (2006.01)

(52) U.S. Cl.
CPC ............... *H05B 47/20* (2020.01); *B60Q 1/04* (2013.01); *B60Q 11/00* (2013.01)

(58) Field of Classification Search
CPC ........ H05B 45/10; H05B 45/46; H05B 45/48; H05B 45/50; H05B 45/52; H05B 47/20; H05B 47/21; B60Q 1/04; B60Q 11/00; B60Q 11/005
See application file for complete search history.

(56) References Cited

U.S. PATENT DOCUMENTS

| | | | | |
|---|---|---|---|---|
| 10,836,310 | B2* | 11/2020 | Takagaki | H05B 45/54 |
| 10,849,204 | B2* | 11/2020 | Hara | H05B 45/58 |
| 11,039,518 | B2* | 6/2021 | Blanchard | H05B 45/46 |
| 2010/0141162 | A1* | 6/2010 | Matsumoto | H05B 45/3725 |
| | | | | 315/186 |
| 2011/0175530 | A1* | 7/2011 | Inoko | H05B 45/385 |
| | | | | 315/82 |

(Continued)

FOREIGN PATENT DOCUMENTS

JP 6130105 B2 5/2017

*Primary Examiner* — Thai Pham
(74) *Attorney, Agent, or Firm* — Kenealy Vaidya LLP

(57) ABSTRACT

To promptly detect a failure of a light source. A vehicle headlight system includes a plurality of light sources, a power supply supplying a drive voltage to the light sources, a controller individually controlling a lit/off state of each light source, and a failure detection circuit connected to the controller and detects a failure of the light sources, where, in response to a start of the vehicle, the controller executes a control operation in which all light sources are controlled from the off state to the lit state and then the light sources are controlled to the off state sequentially and individually, and where, while the control operation is executed, at least during the period of transition from the off state to the lit state of each light source, the controller acquires failure detection result and generates a warning signal when the failure is detected.

5 Claims, 6 Drawing Sheets

(56) References Cited

U.S. PATENT DOCUMENTS

2014/0009065 A1\* 1/2014 Sasaki ................. B60Q 11/005
  315/80
2018/0054870 A1\* 2/2018 Yanagizu ........... H05B 45/3725
2019/0098710 A1\* 3/2019 Murakami ............. H05B 45/00

\* cited by examiner

FIG.3

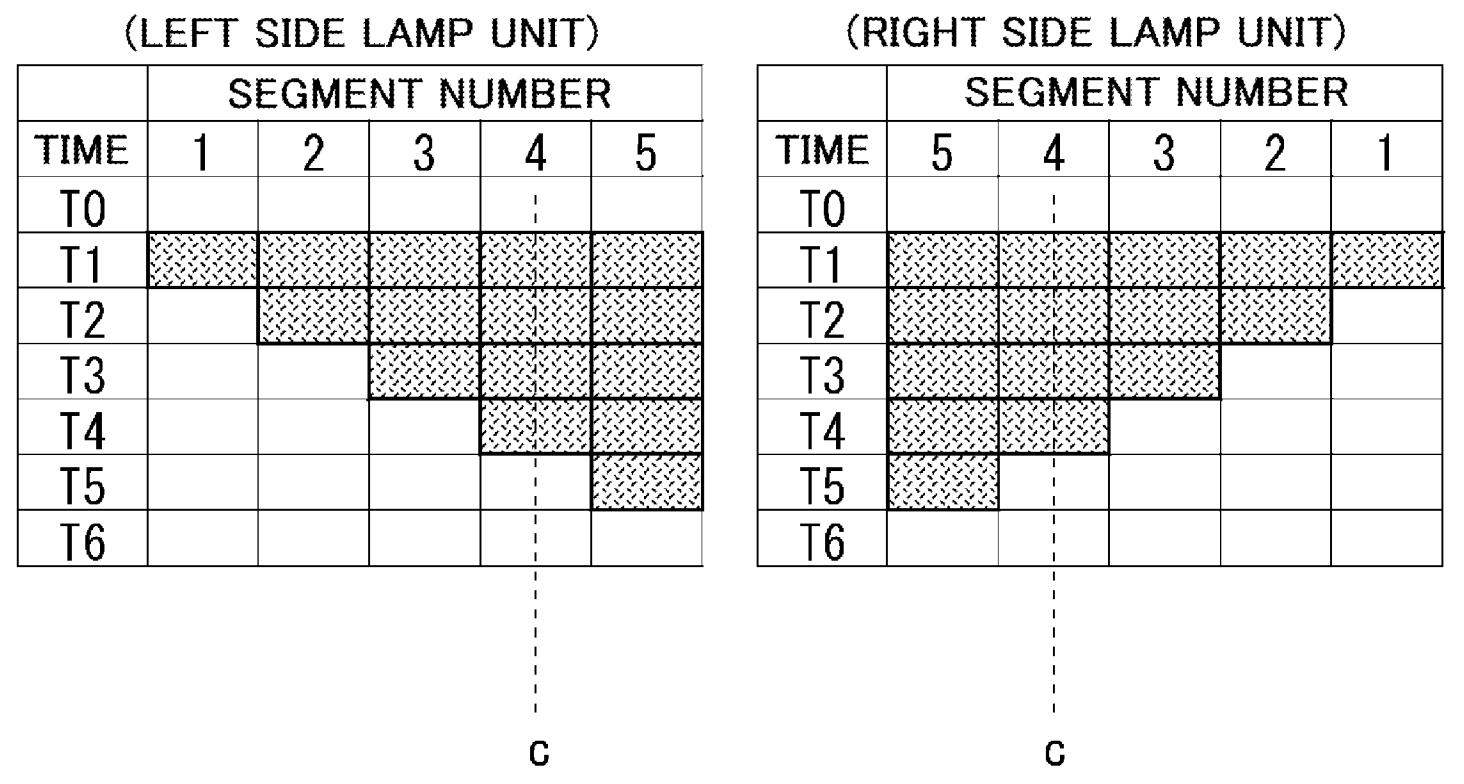

| TIME | SEGMENT NUMBER (LEFT SIDE LAMP UNIT) | | | | |
|---|---|---|---|---|---|
| | 1 | 2 | 3 | 4 | 5 |
| T0 | | | | | |
| T1 | ▓ | | | | |
| T2 | ▓ | ▓ | | | |
| T3 | ▓ | ▓ | ▓ | | |
| T4 | | ▓ | ▓ | ▓ | |
| T5 | | | ▓ | ▓ | ▓ |
| T6 | | | | | |

- - - c

| TIME | SEGMENT NUMBER (RIGHT SIDE LAMP UNIT) | | | | |
|---|---|---|---|---|---|
| | 1 | 2 | 3 | 4 | 5 |
| T0 | | | | | |
| T1 | ▓ | | | | |
| T2 | | ▓ | | | |
| T3 | | | ▓ | | |
| T4 | | | | ▓ | |
| T5 | | | | | ▓ |
| T6 | | | | | |

(LEFT SIDE LAMP UNIT)

| TIME | SEGMENT NUMBER | | | | |
|---|---|---|---|---|---|
| | 1 | 2 | 3 | 4 | 5 |
| T0 | | | | | |
| T1 | ▓ | ▓ | ▓ | ▓ | ▓ |
| T2 | | ▓ | ▓ | ▓ | ▓ |
| T3 | | | ▓ | ▓ | ▓ |
| T4 | | | | ▓ | ▓ |
| T5 | | | | | ▓ |
| T6 | | | | | |
| T7 | ▓ | ▓ | ▓ | ▓ | ▓ |
| T8 | | ▓ | ▓ | ▓ | ▓ |
| T9 | | | ▓ | ▓ | ▓ |
| T10 | | | | ▓ | ▓ |
| T11 | | | | | ▓ |

(RIGHT SIDE LAMP UNIT)

| TIME | SEGMENT NUMBER | | | | |
|---|---|---|---|---|---|
| | 1 | 2 | 3 | 4 | 5 |
| T0 | | | | | |
| T1 | ▓ | ▓ | ▓ | ▓ | ▓ |
| T2 | | ▓ | ▓ | ▓ | ▓ |
| T3 | | | ▓ | ▓ | ▓ |
| T4 | | | | ▓ | ▓ |
| T5 | | | | | ▓ |
| T6 | | | | | |
| T7 | ▓ | ▓ | ▓ | ▓ | ▓ |
| T8 | | ▓ | ▓ | ▓ | ▓ |
| T9 | | | ▓ | ▓ | ▓ |
| T10 | | | | ▓ | ▓ |
| T11 | | | | | ▓ |

FIG.6

(LEFT SIDE LAMP UNIT)

| TIME | SEGMENT NUMBER | | | | |
|---|---|---|---|---|---|
| | 1 | 2 | 3 | 4 | 5 |
| T0 | | | | | |
| T1 | ▨ | ▨ | ▨ | ▨ | ▨ |
| T2 | ▒ | ▨ | ▨ | ▨ | ▨ |
| T3 | ▒ | ▒ | ▨ | ▨ | ▨ |
| T4 | ▒ | ▒ | ▒ | ▨ | ▨ |
| T5 | ▒ | ▒ | ▒ | ▒ | ▨ |
| T6 | ▒ | ▒ | ▒ | ▒ | ▒ |
| T7 | ▒ | ▒ | ▒ | ▒ | ▒ |
| T8 | | | | ▒ | ▒ |
| T9 | | | | | ▒ |
| T10 | | | | | |
| T11 | | | | | |

- - - - c

(RIGHT SIDE LAMP UNIT)

| TIME | SEGMENT NUMBER | | | | |
|---|---|---|---|---|---|
| | 5 | 4 | 3 | 2 | 1 |
| T0 | | | | | |
| T1 | ▨ | ▨ | ▨ | ▨ | ▨ |
| T2 | ▒ | ▨ | ▨ | ▨ | ▨ |
| T3 | ▒ | ▒ | ▨ | ▨ | ▨ |
| T4 | ▒ | ▒ | ▒ | ▨ | ▨ |
| T5 | ▒ | ▒ | ▒ | ▒ | ▨ |
| T6 | ▒ | ▒ | ▒ | ▒ | ▒ |
| T7 | ▒ | ▒ | ▒ | ▒ | ▒ |
| T8 | ▒ | ▒ | ▒ | ▒ | |
| T9 | ▒ | ▒ | | | |
| T10 | ▒ | | | | |
| T11 | | | | | |

- - - - c

VEHICLE HEADLIGHT SYSTEM

BACKGROUND

Technical Field

The present disclosure relates to a vehicle headlight system.

Description of the Background Art

Japanese Patent No. 6130105 discloses a vehicle headlight system which sequentially turns on a plurality of light sources of a first light source group and a plurality of light sources of a second light source group when an ignition switch of a vehicle is turned on.

The vehicle headlight system is provided with a detection means to detect abnormalities (failure) of the light sources when they are sequentially turned on.

In a specific aspect, it is an object of the present disclosure to promptly detect failure of a light source.

SUMMARY

A vehicle headlight system in a vehicle according to one aspect of the present disclosure includes (a) a plurality of light sources, (b) a power supply which supplies drive voltage to the plurality of light sources, (c) a controller configured to individually control a lit state and an off state of each of the plurality of light sources, and (d) a failure detection circuit which is connected to the controller and configured to detect a failure of the plurality of light sources, (e) where, in response to a start of the vehicle, the controller is configured to execute a control operation in which all of the plurality of light sources are controlled from the off state to the lit state and then the plurality of light sources are controlled to the off state sequentially and individually, and where, while the control operation is executed, at least during the period of transition from the off state to the lit state of each of the plurality of light sources, the controller acquires failure detection result detected by the failure detection circuit and generates a warning signal when the failure is detected.

According to the above configuration, failure of the light source can be detected promptly.

BRIEF DESCRIPTION OF THE DRAWINGS

FIG. 3 is a conceptual diagram for explaining the operation of the vehicle headlight system.

FIG. 5 is a conceptual diagram for explaining the operation of the vehicle headlight system of another embodiment.

FIG. 6 is a conceptual diagram for explaining the operation of the vehicle headlight system of another embodiment.

DESCRIPTION OF THE PREFERRED EMBODIMENTS

Figure 1:
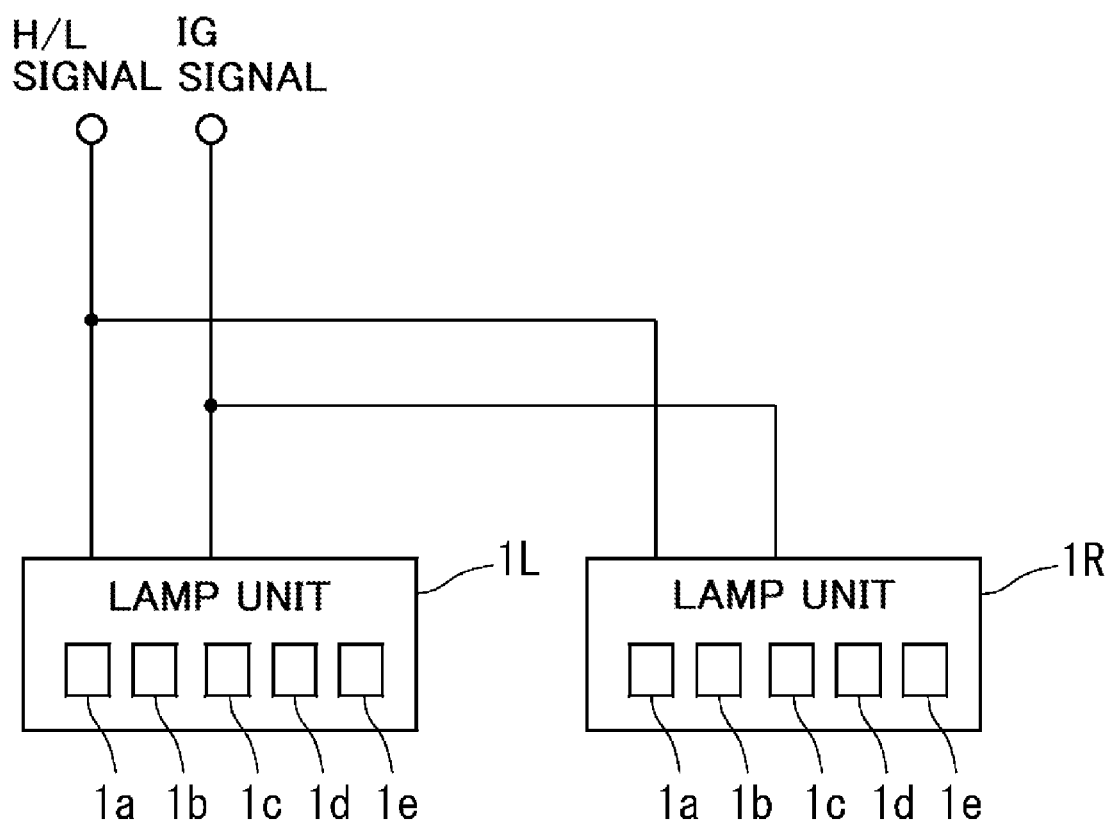
FIG. 1 is a diagram showing a configuration of a vehicle headlight system of one embodiment.

FIG. 1 is a diagram showing a configuration of a vehicle headlight system of one embodiment. The vehicle headlight system of the present embodiment is configured to include a lamp unit 1L installed on the left side of the front part of a vehicle and a lamp unit 1R installed on the right side of the front part of the vehicle. Each of these lamp units 1L and 1R has five lighting on/off segments 1a, 1b, 1c, 1d, and 1e. These lighting on/off segments 1a and the like can be individually switched between lighting on and lighting off. The lamp units 1L and 1R of the present embodiment are used to form irradiation light including a dimming region (or a light shielding region) set according to the situation of an oncoming vehicle or a preceding vehicle existing in front of the own vehicle, for example. The lamp units 1L and 1R are input with an H/L signal indicating the operating state of the switch instructing the lamp lighting of the vehicle and an IG signal indicating the operating state of the ignition switch.

Figure 2:
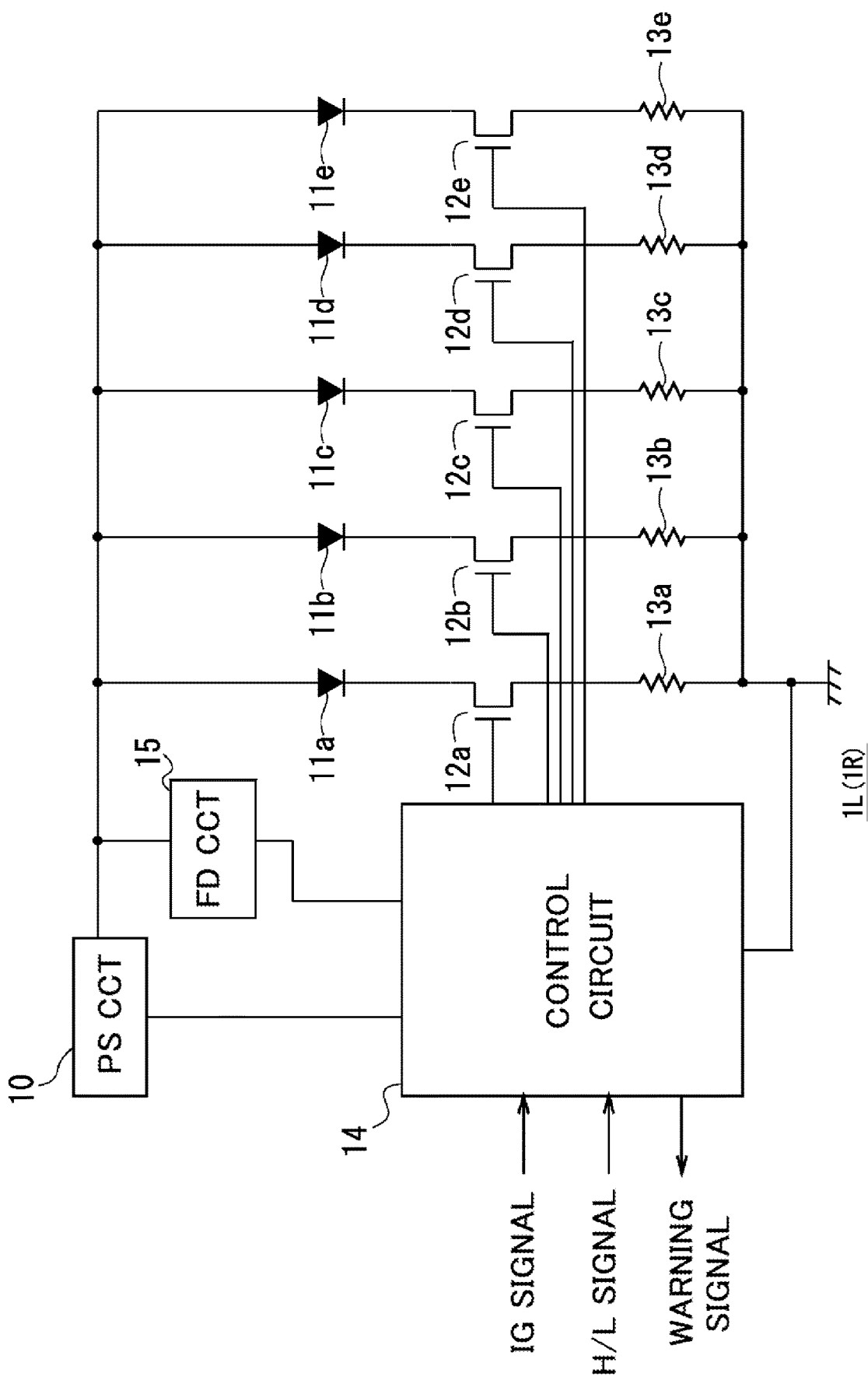
FIG. 2 is a circuit diagram showing an example of a circuit configuration of the lamp unit.

FIG. 2 is a circuit diagram showing an example of a circuit configuration of the lamp unit. Here, since both lamp units 1L and 1R have the same configuration, only the circuit configuration of lamp unit 1L is shown here. The illustrated lamp unit 1L is configured to include a power supply circuit (power supply) 10 (abbreviated as "PS CCT" in FIG. 2), five light emitting elements (LEDs) 11a, 11b, 11c, 11d, 11e, five switching elements 12a, 12b, 12c, 12d, 12e, five resistance elements 13a, 13b, 13c, 13d, 13e, a control circuit 14, and a failure detection circuit 15 (abbreviated as "FD CCT" in FIG. 2). In this embodiment, each of the light emitting elements 11a and the like corresponds to a "light source", and five switching elements 12a, 12b, 12c, 12d, 12e and the control circuit 14 correspond to a "controller".

The power supply circuit 10 is connected to the anode side of each of the light emitting elements 11a and the like, and supplies a driving voltage for causing each of the light emitting elements 11a and the like to emit light. Further, the power supply circuit 10 is connected to the control circuit 14 and adjusts the magnitude of the driving voltage based on a control signal provided from the control circuit 14.

The light emitting elements 11a, 11b, 11c, 11d, and 11e are connected in parallel, each anode side is connected to the power supply circuit 10, and each cathode side is connected to each of the switching elements 12a and the like. In the present embodiment, the light emitting element 11a corresponds to the above-described lighting on/off segment 1a, the light emitting element 11b corresponds to the above-described lighting on/off segment 1b, and the light emitting element 11c corresponds to the above-described lighting on/off segment 1c, the light emitting element 11d corresponds to the above-described lighting on/off segment 1d, and the light emitting element 11e corresponds to the above-described lighting on/off segment 1e.

Here, although the embodiment describes an example where each light emitting element corresponds to one lighting on/off segment, each lighting on/off segment may be associated with a plurality of light emitting elements.

In the switching element 12a, one input-output terminal is connected to the cathode side of the light emitting element 11a, the other input-output terminal is connected to one end of the resistance element 13a, and the control terminal is connected to the control circuit 14. Connection relationship among the other switching elements 12b to 12e, the light emitting elements 11b to 11e, the resistance elements 13b to 13e, and the control circuit 14 is the same as that of the switching element 12a. As each of the switching elements 12a and the like, for example, a field effect transistor as shown in the figure can be used, but other switching elements such as a bipolar transistor may be used as well. In each of the switching elements 12a or the like, based on a control signal provided from the control circuit 14 to each control terminal, current path between the pair of input-output terminals becomes an open state or a closed state, and during the open state, current flowing through the current path increases or decreases according to the control signal provided to the control terminal.

In each of the resistance elements 13a to 13e, one end is connected to each of the switching elements 12a to 12e, respectively, and the other end is connected to a reference potential terminal (GND). These resistance elements 13a and the like are current limiting resistors for each light emitting element 11a and the like.

The control circuit 14 is connected to each of the switching element 12a or the like, and provides a control signal to the control terminals of these switching elements 12a or the like. Further, the control circuit 14 is connected to the current path between each resistance element 13a or the like and the reference potential terminal, detects electrical current flowing through each resistance element 13a or the like, and controls the power supply circuit 10 so that the magnitude of the electrical current becomes a predetermined value. Further, when a failure of at least one of the light emitting element 11a or the like is detected by the failure detection circuit 15, the control circuit 14 outputs a predetermined warning signal to a host device (for example, a control unit provided in the vehicle) which is not shown in the figure, and performs control such as stopping the driving voltage supply from the power supply circuit 10. The control circuit 14 may be realized by a hardware composed of a combination of an IC and a circuit element, or may be realized by using a microcomputer and a software executed by the microcomputer.

The failure detection circuit 15 is connected between the power supply circuit 10 and each light emitting element 11a or the like, and detects a failure when the failure has occurred in at least one of the light emitting element 11a or the like. The failure referred to here is a short failure (short circuit failure) or an open failure (open circuit failure). Specifically, when a short failure or an open failure occurs in any of the light emitting elements 11a and the like, since the current amount flowing from the power supply circuit 10 increases or decreases from the assumed amount, the failure detection circuit 15 detects the current amount and outputs a failure detection signal to the control circuit 14 when the current amount increases or decreases from the predetermined standard.

FIG. 3 is a conceptual diagram for explaining the operation of the vehicle headlight system. In the figure, segment numbers 1, 2, 3, 4, and 5 correspond to the lighting on/off segments 1a, 1b, 1c, 1d, and 1e of each of the lamp units 1L and 1R, respectively. The lighting on/off segments 1a and the like of the lamp units 1L and 1R are arranged bilaterally symmetrically as shown in the figure, and the segment numbers are larger toward the center side of the vehicle. As shown in the figure, in each of the lamp units 1L and 1R, the lighting on/off segment 1d of segment number 4 corresponds to the light emitted to the center c in front of the vehicle. Further, in the figure, the rectangular block with a pattern indicates that the lighting on/off segment is "lit", and the rectangular block without a pattern indicates that the lighting on/off segment is "off". Further, time T0 to T6 are introduced in order to express the lighting on/off state in chronological order, and transitions from T0 to T6 in order. Here, the intervals among periods T0 to T6 are not always constant.

For example, at time T0, when the ignition switch of the vehicle is turned on (started), then at time T1, all the lighting on/off segments 1a to 1e of segment numbers 1 to 5 are controlled to be in a lit state. Next, at time T2, the lighting on/off segment 1a of segment number 1 is controlled to be in a off state, and the other lighting on/off segments are maintained in a lit state. Next, at time T3, in addition to segment number 1, the lighting on/off segment 1b of segment number 2 is controlled to be in a off state, and the other lighting on/off segments are maintained in the lit state. Next, at time T4, in addition to segment numbers 1 and 2, the lighting on/off segment 1c of segment number 3 is controlled to be in the off state, and the other lighting on/off segments are maintained in the lit state. Next, at time T5, in addition to segment numbers 1, 2, and 3, the lighting on/off segment 1d of segment number 4 is controlled to be in the off state, and the lighting on/off segment 1e of segment number 5 is maintained in the lit state. Next, at time T6, the lighting on/off segments corresponding to all segment numbers are controlled to be in the off state. That is, as an overall operation, all the lighting on/off segments are first controlled to be in the lit state, and then the lighting on/off segments corresponding to the outside of the vehicle (those starting with a smaller segment number) are individually and sequentially controlled to be in the off state, and finally, all the lighting on/off segments are controlled to be in the off state.

Figure 4:
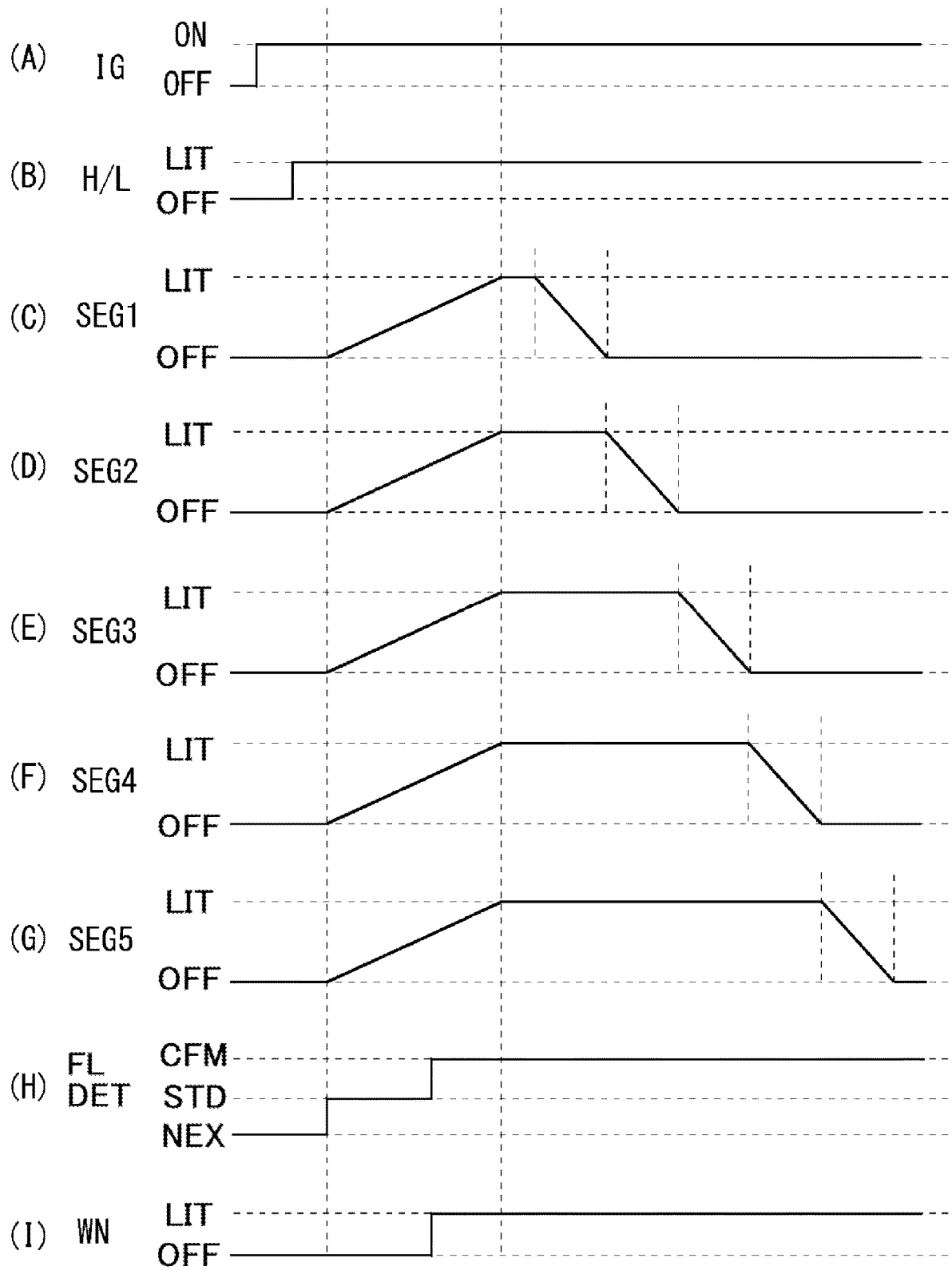
FIG. 4 is a timing chart showing the operation of the vehicle headlight system shown in FIG. 3.

FIG. 4 is a timing chart showing the operation of the vehicle headlight system shown in FIG. 3. In the figure, the notations of SEG1 to SEG5 correspond to the above-described segment numbers 1 to 5, respectively. Further, "IG" indicates the on/off of the ignition signal, "H/L" indicates the state of the H/L signal (lit/off), and "FAILURE DETECTION" (abbreviated as "FL DET" in FIG. 4) indicates the state of the failure detection circuit 15 (Not Executed/Started/Confirmed, in FIG. 4, abbreviated as "NEX", "STD", and "CFM", respectively), and "WN" indicates the state of the warning signal (lit/off).

As shown in the figure, when the ignition signal is turned on (time T0: refer to FIG. 3) and then the H/L signal becomes a lit state, all the lighting on/off segments 1a to 1e corresponding to segment numbers 1 to 5 change from "off" to "lit". Specifically, the switching elements 12a to 12e become an open state by the control of the control circuit 14, then current flows out to the light emitting elements 11a to 11e, and the light emitting elements 11a to 11e are lit. In the present embodiment, the period during which each light emitting element 11a or the like transitions from the off state to the lit state is set to substantially the same length (for example, 0.7 seconds each). Further, in the present embodiment, each of the light emitting elements 11a and the like starts the transition from the off state to the lit state at substantially the same time, and reaches the lit state at substantially the same time.

At this time, the control circuit 14 starts failure detection based on a failure detection signal output from the failure detection circuit 15 in accordance with controlling the switching elements 12a and the like from the closed state to the open state. That is, during the period in which each light emitting element 11a or the like transitions from the off state to the lit state and the period in which the lit state is maintained, the control circuit 14 acquires the failure detection signal output from the failure detection circuit 15 and performs failure detection based on the detection result. Then, when a failure has occurred in any of the light emitting elements 11a to 11e, a corresponding failure detection signal is output from the failure detection circuit 15, so that the control circuit 14 switches the warning signal to "lit" based on the failure detection signal. In other words, when failure is detected, the control circuit 14 generates a warning signal corresponding thereto. Warning lamp is lit at the host device which receives the warning signal from the control circuit 14.

As described above, since all the light emitting elements 11a to 11e are lit at once and failure detection is performed at once in accordance with the lighting, it is possible to promptly notify the driver, etc. when a failure has occurred. The time required from when the ignition switch is turned on until the warning signal is generated and the warning lamp is turned on is constant regardless of the position of the light emitting element in which the failure has occurred, and has the advantage of the time being short. Further, by first turning on all the light emitting elements 11a to 11e, failure detection is firstly performed in a condition where the largest load is applied to the power supply circuit 10 or the like, and failure can be detected promptly.

After all the light emitting elements 11a to 11e are lit, the switching elements 12a to 12e are sequentially controlled to a closed state by the control circuit 14 with a time lag, so that each of the light emitting elements 11a to 11e are turned off with a time lag. As a result, as shown in FIG. 3, each of the lighting on/off segments 1a to 1e are turned off in sequence in a predetermined order.

According to the above embodiment, failure of the light emitting element (light source) can be detected promptly.

It should be noted that this disclosure is not limited to the subject matter of the foregoing embodiment, and can be implemented by being variously modified within the scope of the present disclosure as defined by the appended claims. For example, circuit configuration of the lamp unit is not limited to the one illustrated in FIG. 2, and can be variously modified and implemented. Further, the number of lighting on/off segments included in each of the lamp units 1L and 1R is not limited to that of the above-described embodiment. Further, the arrangement of the lighting on/off segments in each of the lamp units 1L and 1R is not limited to the arrangement along one direction as illustrated in the above embodiment.

Further, the use of each lamp unit 1L, 1R is not limited to forming a high beam, and may be used for other variety of vehicle light such as a direction indicator lamp. Further, although light emitting elements (LEDs) are shown as an example of a light source, the light source is not limited thereto, and may be a laser element or the like, for example.

Further, although an ignition signal is used to detect the start of the vehicle, other signal may be used. For example, in the case of a vehicle such as an electric vehicle which does not have an internal combustion engine, an internal signal indicating the start of the vehicle can be used instead of an ignition signal.

Further, after the ignition signal is turned on, the operation where all the lighting on/off segments are lit and then turned off sequentially with a time lag may be repeated multiple times. For example, as shown in FIG. 5, the same operation as the operation from time T0 to T5 (refer to FIG. 3) may be performed from time T6 to T11, and failure detection may be performed during each operation. Further, the same operation may be performed from the third time onward. By performing the operation multiple times, failure detection can be performed more reliably.

Further, after the ignition signal is turned on, while all the lighting on/off segments are lit and then turned off with a time lag, instead of turning off each lighting on/off segment immediately, each lighting on/off segment may be turned off in a step-wise manner by setting a period in which the luminous intensity (brightness) is lowered to a halftone state. For example, as shown in FIG. 6, after turning on the lighting on/off segment in the same manner as the operation from time T0 to T5 (refer to FIG. 3), the luminous intensity may be reduced to half (50%) for a certain period of time to maintain the halftone state. In detail, for example, the lighting on/off segment of segment number 1 is controlled such that, after the segment becomes a lit state at time T1, a period of halftone state in which the luminous intensity is halved is set from time T2 to T7, and the segment is turned off at the subsequent time T8. The same applies to the lighting on/off segments of other segment numbers, and the period of the halftone state in which the luminous intensity is halved and the time in which the segment is brought into a off state are controlled so that they each arrive with a time lag.

As described above, by turning off the segments in a step-wise manner with a lighting period in which the luminous intensity is halved, it is possible to detect a failure of the circuit which controls the luminous intensity in a step-wise manner. For example, in the circuit described above (the circuit diagram exemplified in FIG. 2), by controlling the current amount flowing between the input-output terminals (current path) of each of the switching elements 12a to 12e, the current which flows to each of the light emitting elements 11a to 11e can be increased or decreased, thereby the luminous intensity of the emitted light can be controlled in a step-wise manner. During this operation, if there is a failure of each switching element 12a or the like or a failure of the control circuit 14, then, since the current amount does not correspond to that of the predetermined luminous intensity, failure can be detected by the failure detection circuit 15.

The present application is based on, and claims priority from, JP Application Serial Number, 2020-158281 filed on Sep. 23, 2020, the disclosure of which is hereby incorporated by reference herein in its entirety.

DESCRIPTION OF THE REFERENCE NUMERALS

10: Power supply circuit
11a, 11b, 11c, 11d, 11e: Light emitting element
12a, 12b, 12c, 12d, 12e: Switching element
13a, 13b, 13c, 13d, 13e: Resistance element
14: Control circuit
15: Failure detection circuit

What is claimed is:

1. A vehicle headlight system in a vehicle comprising:
    a plurality of light sources;
    a power supply which supplies drive voltage to the plurality of light sources;
    a controller configured to individually control a lit state and an off state of each of the plurality of light sources; and
    a failure detection circuit which is connected to the controller and configured to detect a failure of the plurality of light sources,
    wherein, in response to a start of the vehicle, the controller is configured to execute a control operation in which all of the plurality of light sources are controlled from the off state to the lit state and then the plurality of light sources are controlled to the off state sequentially and individually, and
    wherein, while the control operation is executed, at least during the period of transition from the off state to the lit state of each of the plurality of light sources, the controller acquires failure detection result detected by the failure detection circuit and generates a warning signal when the failure is detected.

2. The vehicle headlight system according to claim 1, wherein the controller is configured to detect the start of the vehicle based on a signal obtained from the vehicle.

3. The vehicle headlight system according to claim 1, wherein, in response to a start of the vehicle, the controller is configured to execute a control operation in which all of the plurality of light sources are controlled from the off state to the lit state and then the plurality of light sources are controlled to the off state sequentially and individually, and the control operation is repeated multiple times, and wherein, every time the control operation is executed, at least during the period of transition from the off state to the lit state of all of the plurality of light sources, the controller acquires failure detection result detected by the failure detection circuit and generates a warning signal when the failure is detected.

4. The vehicle headlight system according to claim 1, wherein, in response to a start of the vehicle, the controller is configured to execute a control operation in which all of the plurality of light sources are controlled from the off state to the lit state and then the plurality of light sources are controlled to the off state sequentially and individually, and wherein, while the control operation is executed, during the period of transition from the lit state to the off state of each of the plurality of light sources, the controller controls each of the plurality of light sources so that there exists a period of time for maintaining a specified halftone state whose brightness is between that of the lit state and the off state.

5. The vehicle headlight system according to claim 1, wherein the period of time during which each of the plurality of light sources transitions from the off state to the lit state are substantially the same.

* * * * *